United States Patent [19]

Nakanishi

[11] Patent Number: 5,103,357

[45] Date of Patent: Apr. 7, 1992

[54] TAPE RECORDER INCLUDING A DEVICE FOR OPENING A LID OF TAPE CASSETTE DURING THE LOADING THEREOF

[75] Inventor: Yasuyuki Nakanishi, Sanda, Japan

[73] Assignee: Mitsubishi Denki Kabushiki Kaisha, Tokyo, Japan

[21] Appl. No.: 525,961

[22] Filed: May 11, 1990

[30] Foreign Application Priority Data

May 18, 1989 [JP] Japan ................... 1-122782
May 18, 1989 [JP] Japan ................... 1-122786
May 29, 1989 [JP] Japan ................... 1-132852

[51] Int. Cl.$^5$ ........................... G11B 15/675
[52] U.S. Cl. ................................... 360/96.5
[58] Field of Search ............ 360/96.5, 96.6, 85

[56] References Cited

U.S. PATENT DOCUMENTS 4,782,407 11/1988 Hwang ................ 360/85

FOREIGN PATENT DOCUMENTS 62-57951 4/1987 Japan .

Primary Examiner—Robert S. Tupper
Attorney, Agent, or Firm—Burns, Doane, Swecker & Mathis

[57] ABSTRACT

In a digital audio tape recorder (DAT), a loading mechanism has a cassette holder for carrying a cassette between an insertion position and a setting position, a lid opening lever for the opening and closing of a lid of the cassette, and a frame having L-shaped guide grooves for guiding the movement of the cassette holder, and an opening and closing guide groove for controlling the rotational and translational movement of a link lever, wherein the position of the link lever controls the degree of rotation of the lid opening lever, the lid of the cassette being forcibly and reliably opened and closed by the rotation of the lid opening lever.

3 Claims, 9 Drawing Sheets

TAPE RECORDER INCLUDING A DEVICE FOR OPENING A LID OF TAPE CASSETTE DURING THE LOADING THEREOF

BACKGROUND OF THE INVENTION

1. Field of the Invention

The present invention relates to a loading mechanism of a cassette tape recorder, and especially relates to a loading mechanism of a cassette tape recorder such as a digital audio tape recorder (hereinafter abbreviated as DAT) which has a cassette holder for carrying a cassette with a lid between an insert position and a setting position.

2. Description of the Prior Art

A conventional loading mechanism of a cassette tape recorder, for example, shown in Published Unexamined Japanese Utility Model Application Sho 62-57951 is described referring to FIGS. 9, 10, 11 and 12.

In the figures, a cassette 40 containing a magnetic tape has a lid 40a which is urged by a spring in the cassette 40 (not shown in the figure) in a direction normally to close. A cassette holder 41 carries the cassette 40 between an insert position and a setting position. A lid opener 43 is rotatably supported by a pivot 42 at a position in the vicinity of the rear and lower end of the cassette holder 41 and has applied to it a torsional force in counterclockwise direction by a spring (not shown). A holding pin 44 is fixed on a deck 45 for holding the lid 40a in an opening state. Another pin 46 is provided in the vicinity of the holding pin 44 for pushing up to rotate the lid opener 43.

In the above-mentioned conventional loading mechanism of cassette tape recorder, when the cassette 40 is inserted into the cassette holder 41, the cassette 40 is kept in the cassette holder 41 by contacting a front end of a sliding lever (not shown). At this time, the lid 40a of the cassette 40 is at a position above the front edge 43a of the lid opener 43, as shown in FIG. 10.

When the cassette 40 is further pushed into the cassette holder 41 by a force of a hand which is stronger than that in the above-mentioned insert operation, the sliding lever touches a starting switch (not shown). When the starting switch is closed, the cassette holder 41 which contains the cassette 40 moves in a horizontal direction inward of the cassette tape deck 45.

During the movement of the cassette holder 41, the lid opener 43 is rotated by contacting the pin 46 in clockwise direction around the pivot 42 against an elastic force of a spring (not shown) which is applied to close the lid 40a. As a result, the lid 40a rotates through a predetermined angle in a counterclockwise direction and the lid 40a of the cassette 40 is opened as shown in FIG. 11.

After that, the cassette holder 41 carrying the cassette 40 moves down and the cassette 40 is mounted at a predetermined position. During the moving down of the cassette holder 41, the lid 40a, which is opened a predetermined angle by rotation of the lid opener 43, is fully opened by further contacting with and held by the folding pin 44, as shown in FIG. 12. When the cassette 40 is mounted at the predetermined position, the front end of the lid opener 43 touches the pin 46 and thereby the lid opener 43 is fixed at its uppermost position.

In the above-mentioned conventional loading mechanism of cassette tape recorder, there is a requirement that the pivot 42 of the lid opener 43 must be located at a position in the vicinity of a lower and rear end of the cassette holder 41. This is because, when the pivot 42 is positioned at a position in the vicinity of a higher and rear end of the cassette holder 41 as shown in FIGS. 13 and 14, the front end 43a of the lid opener 43 interferes the lid 40a of the cassette 40 during the opening operation of the lid 40a as shown in FIG. 14; and thereby the lid 40a cannot fully be opened.

In order to prevent the interference of the lid opener 43 and the lid 40a, the pivot 42 must be positioned in the vicinity of the lower and rear end of the cassette holder 41. As a result, a driving mechanism of the lid opener 43 must be positioned below the cassette holder 41. Thereby, the size of deck 45 can not be decreased, and hence the size of the cassette tape recorder can not be decreased.

Furthermore, the lid opener 43 is rotated in a counterclockwise direction by a spring in the cassette 40 during the movement of the cassette holder 41 from the setting position to the insert position. If the lid opener 43 cannot rotate for some reason and the cassette 40 is carried to the insert position without closing the lid 40a, the lid 40a may be broken when the cassette 40 is taken out from the cassette holder 41.

SUMMARY OF THE INVENTION

Purpose of the present invention is to provide an improved loading mechanism of cassette tape recorder directed at reliably opening and closing the cassette lid and for decreasing the size of the cassette tape recorder.

A loading mechanism of a cassette tape recorder in accordance with the present invention comprises:

a cassette holder for carrying a cassette provided with a lid between an insert position and a setting position;

a link lever rotatably supported in the vicinity of the rear end of the cassette holder; and a lid opening lever which has a hook for pushing the lid to open by rotation thereof and is coupled with the link lever at the moving end part thereof.

In the present invention, the link lever is rotated around a pivot and the lid opening lever is also rotated. The lid of the cassette is opened by the movement of the hood due to the rotation of the lid opening lever.

DESCRIPTION OF THE PREFERRED EMBODIMENTS

A preferred embodiment of a loading mechanism of cassette tape recorder in accordance with the present invention is described referring to FIGS. 1-8.

Figure 1:
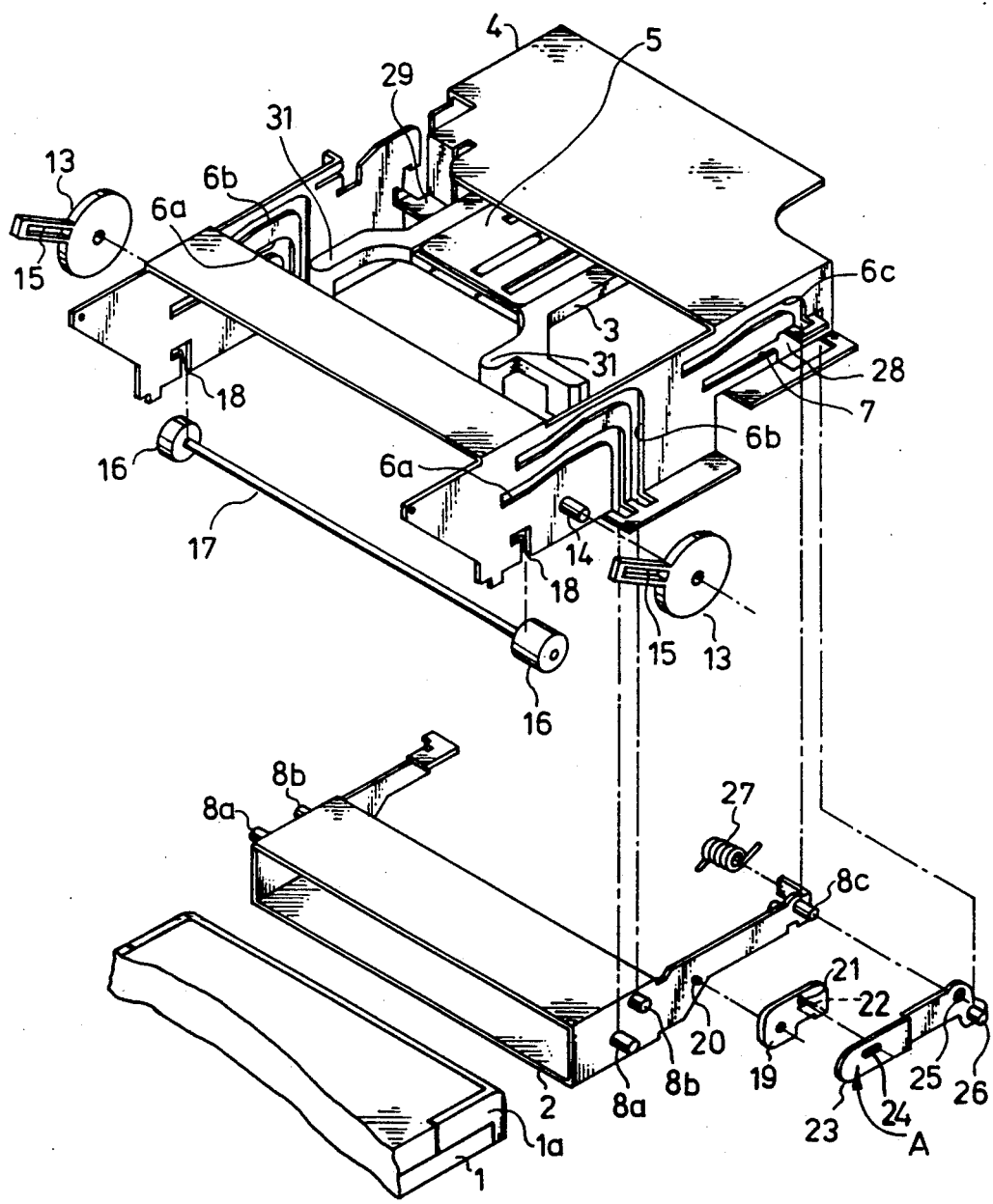
FIG. 1 is an exploded perspective view showing a preferred embodiment of a loading mechanism of cassette tape recorder in accordance with the present invention.
Figure 2:
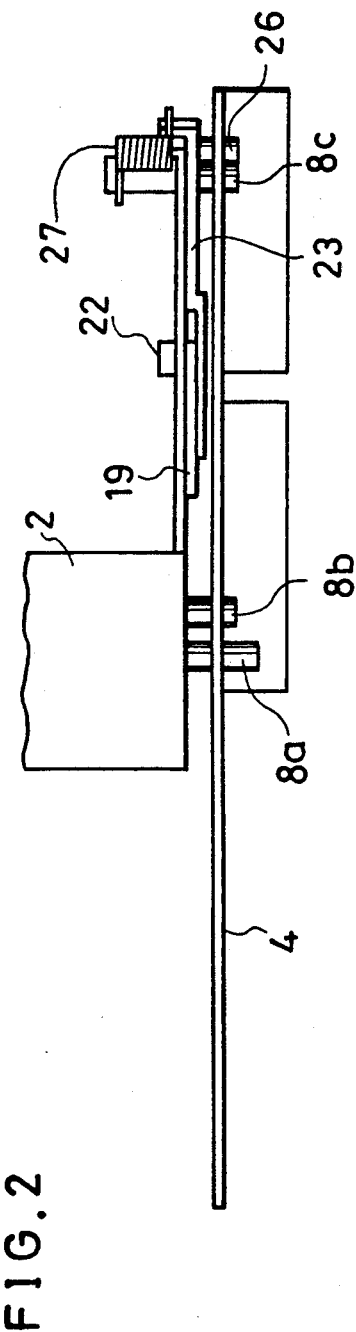
FIG. 2 is a plan view showing the embodiment of the loading mechanism of cassette tape recorder shown in FIG. 1.
Figure 3:
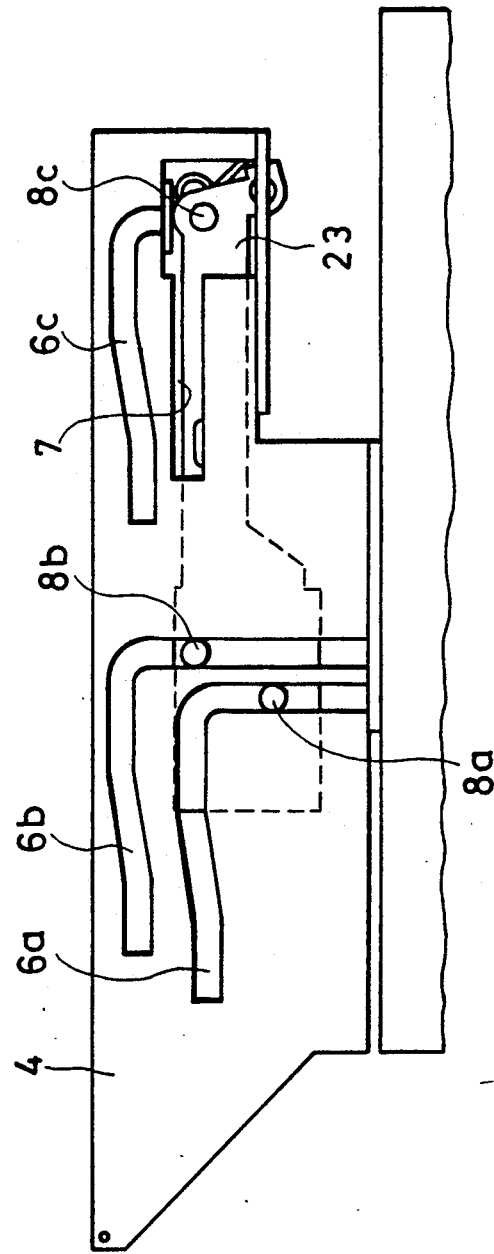
FIG. 3 is a side view showing the embodiment of the loading mechanism of cassette tape recorder shown in FIG. 2.

As shown in FIGS. 1, 2 and 3, a cassette 1 contains a magnetic tape (not shown) and has a lid 1a and a spring (not shown) for applying a force in a direction to close the lid. A cassette holder 2 holds and carries the cassette 1 between an insert position, where the cassette 1 is inserted into and taken out of the cassette holder 2, and a setting position where the cassette 1 is mounted on a deck and the magnetic tape is wound around a head. A sliding lever 3 moves, touching a front end of the cassette 1. A frame 4 is provided, enclosing the sliding lever 3, and has a pair of vertical walls. A sliding plate 5 is slidably held on the ceiling of the frame 4 and is superposed on the sliding lever 3. First and second L-shaped guide grooves 6a and 6b are formed on the front part of respective side walls of the frame 4. A third guide groove 6c is formed in the rear part of one of the side walls of the frame 4. Another lever guide groove 7 is formed below the third guide groove 6c and has an opening 28. First and second guide pins 8a and 8b are fixed on both side walls of the cassette holder 2 and coupled with the first and second guide grooves 6a and 6b, and thereby, the cassette holder 2 moves along the guide grooves 6a and 6b. A third guide pin 8c is fixed on an extended part of a side wall of the cassette holder 2 and coupled with the third guide groove 6c.

Arm gears 13 and 13 are rotatably mounted by pivots 14 on the outsides of the side walls of the frame 4. In the arm parts of the arm gears 13 and 13, guide grooves 15 and 15 are formed in a manner to be coupled with the first and second guide pins 8a and 8b. Synchronizing gears 16 and 16, which are connected by a shaft 17, are geared with the arm gears 13 and 13 for driving them. The shaft 17 is coupled with grooves 18 on the side walls of the frame 4.

A lid opening lever 19 is rotatably supported by a pivot 20 fixed on the side wall of the cassette holder 2 and has a link pin 21 and a hook 22. A link lever 23 has a link groove 24 for coupling with the link pin 21 therein, a hole 25 to be coupled with for supporting by the third guide pin 8c for supporting the link lever 23, and a guide pin 26 to be coupled with and guided by the guide groove 7. The lid opening lever 19 and the link lever 23 constitute an open and closing lever. A torsion spring 27 is provided on the cassette holder 2 in the vicinity of the third guide pin 8c. One arm of the spring 27 presses an end of the link lever 23 and the other arm of the spring 27 presses the base part of the cassette holder, and thereby, the link lever 23 is urged by the spring 27 in a direction shown by arrow A in FIG. 1.

In the following, the operation of the DAT having the above-mentioned loading mechanism is described.

Figure 4:
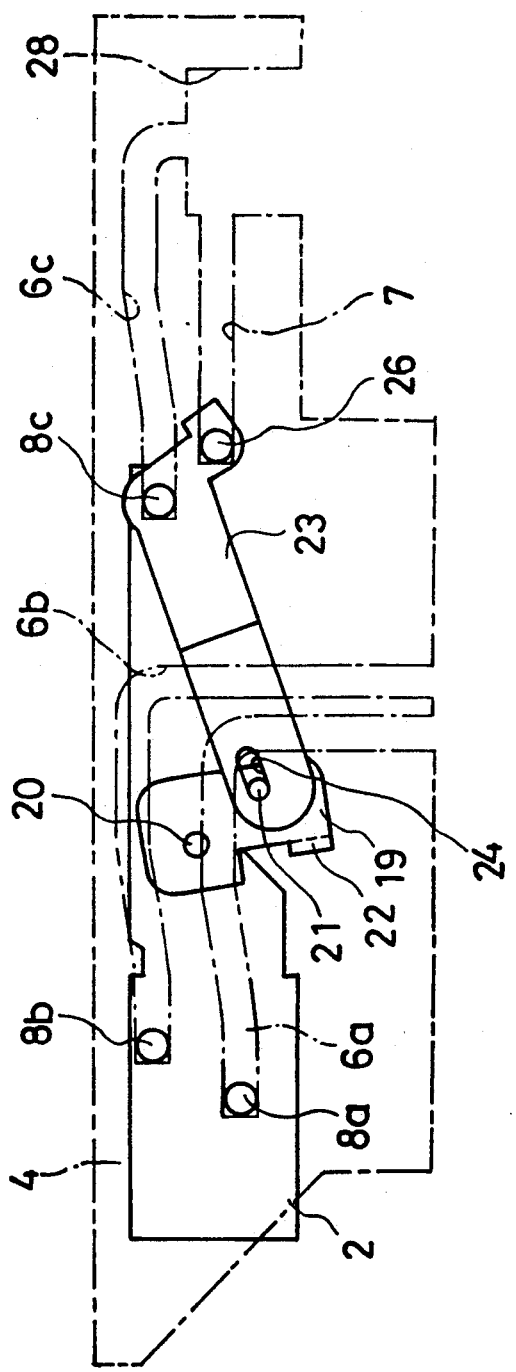
FIG. 4, FIG. 5, FIG. 6, FIG. 7 and FIG. 8 are side view showing relations of a link lever, a lid opening lever and a lid of a cassette in the loading mechanism of cassette tape recorder in accordance with the present invention.
Figure 5:
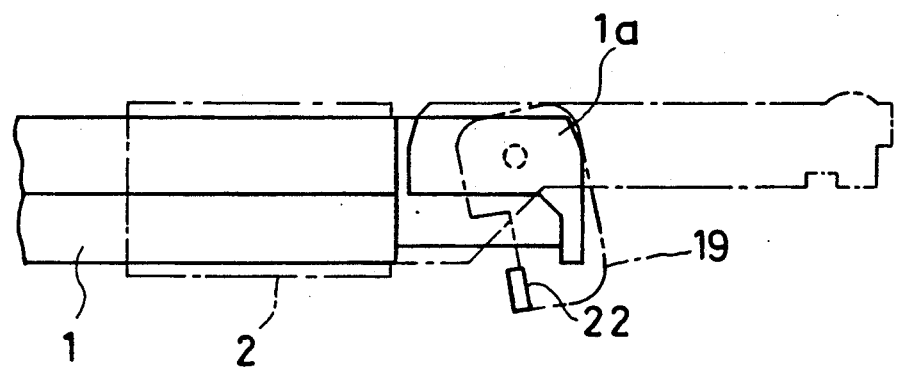

In the loading operation of the cassette 1, when the cassette 1 is inserted into the cassette holder 2, the innermost part of the cassette 1 touches the front parts 31 and 31 of the sliding lever 3 and is kept in the cassette holder 2. At this time, the first and the second guide pins 8a and 8b of the cassette holder 2 are positioned at end parts of the first and the second guide grooves 6a and 6b, respectively. And the third guide pin 8c of the cassette holder 2 is also positioned at the end part of the third guide grooves 6c. The link lever 23 is coupled with the lid opening lever 19 by coupling to the cassette holder 2 via the third guide pin 8c as shown in FIGS. 4 and 5. Therefore the rotation of the link lever 23 in a counterclockwise direction makes the lid opening lever 19 rotate in clockwise direction.

After that, when the cassette 1 is further pressed by hand with stronger force than that used in the insert operation of the cassette 1, the sliding lever 3 touches a starting switch (not shown in the figure). The synchronizing gears 16 are rotated by a driving source (not shown in the figure) owing to the operation of the starting switch. Thereby, the arm gears 13 and 13 which are geared with the synchronizing gears 16 and 16 are rotated. The first and the second guide pins 8a and 8b which are coupled with the guide grooves 15 and 15 of the arm gears 13 and 13 are moved along the guide grooves 6a and 6b, respectively. As a result, the cassette holder 2 with the cassette 1 proceeds to the interior of the frame 4.

Figure 7:
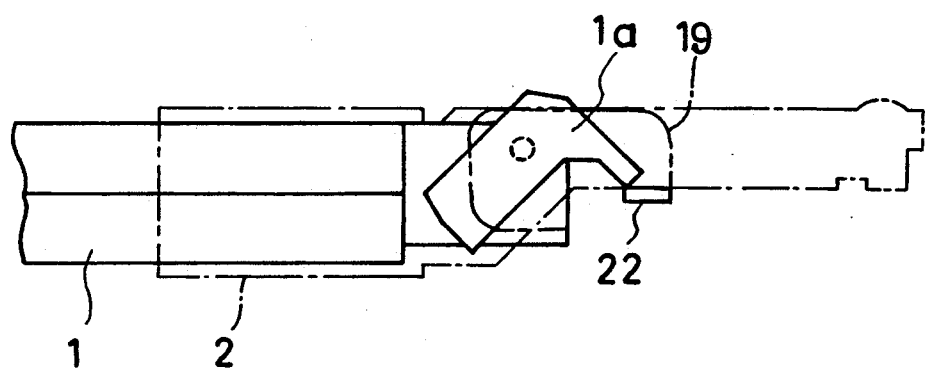
Figure 6:
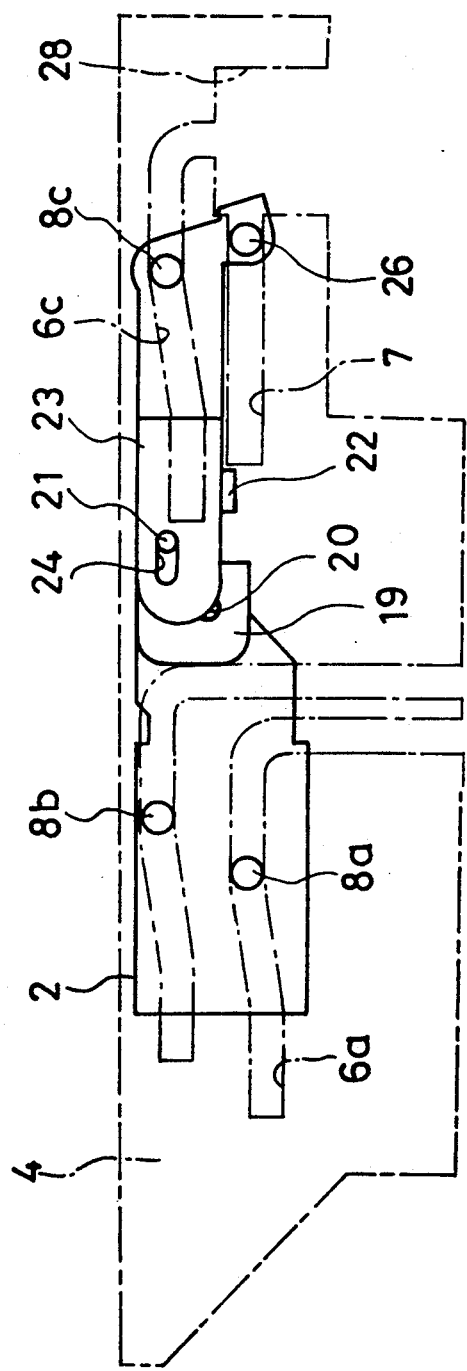
Figure 8:
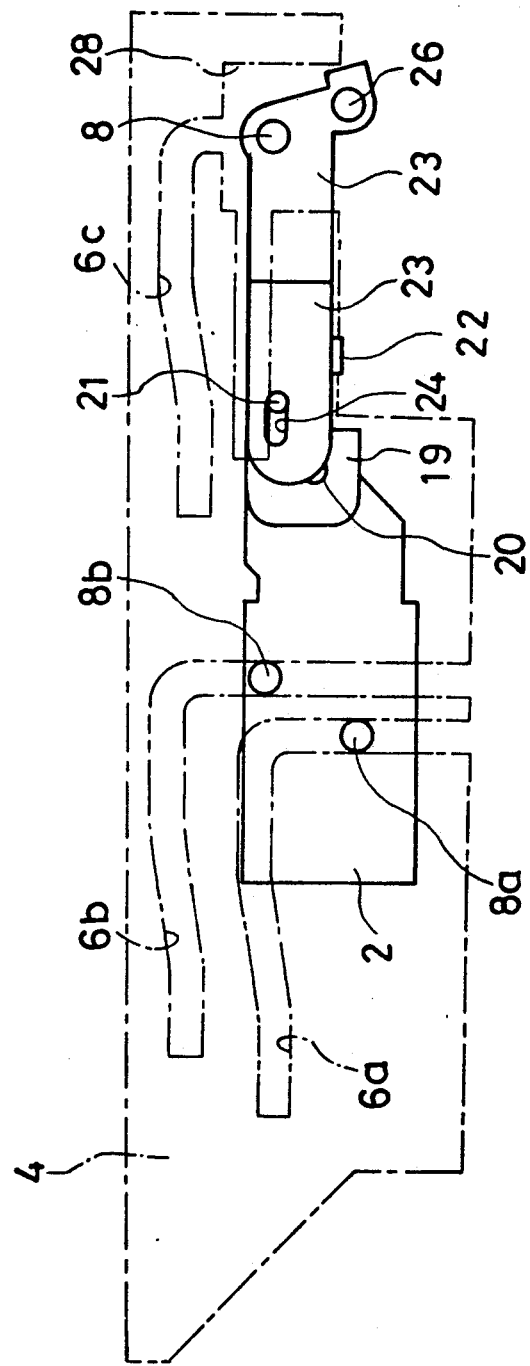
Figure 9:
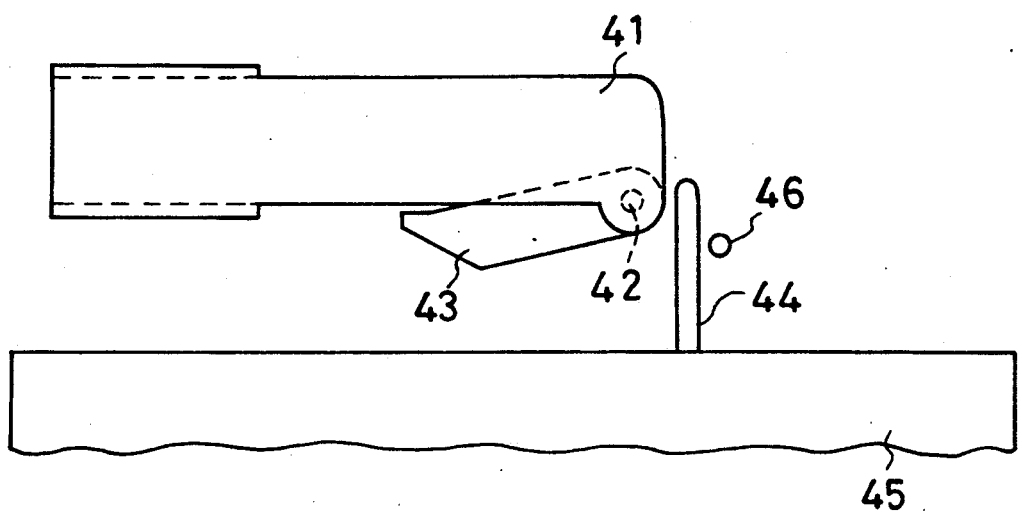
FIG. 9, FIG. 10, FIG. 11 and FIG. 12 are side views showing the movement of the conventional loading mechanism of cassette tape recorder.
Figure 10:
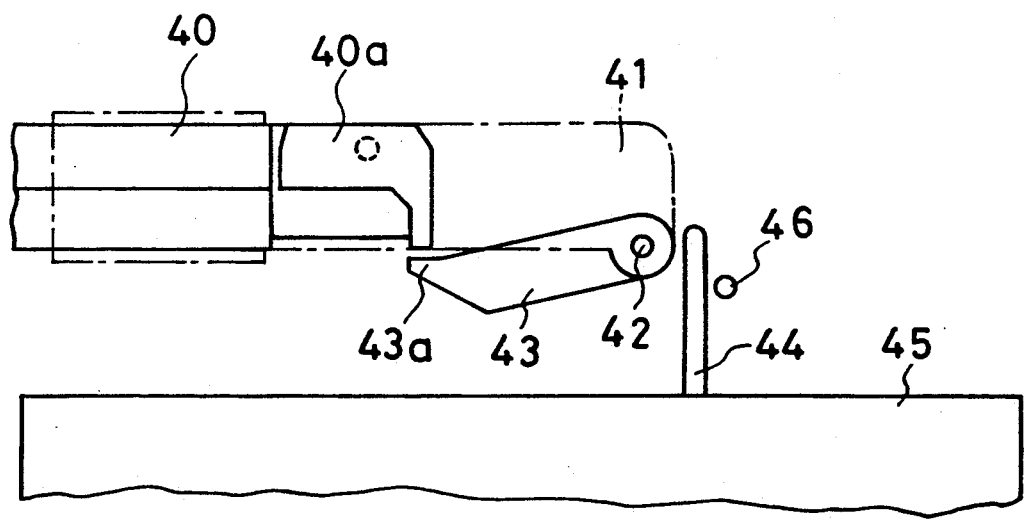
Figure 11:
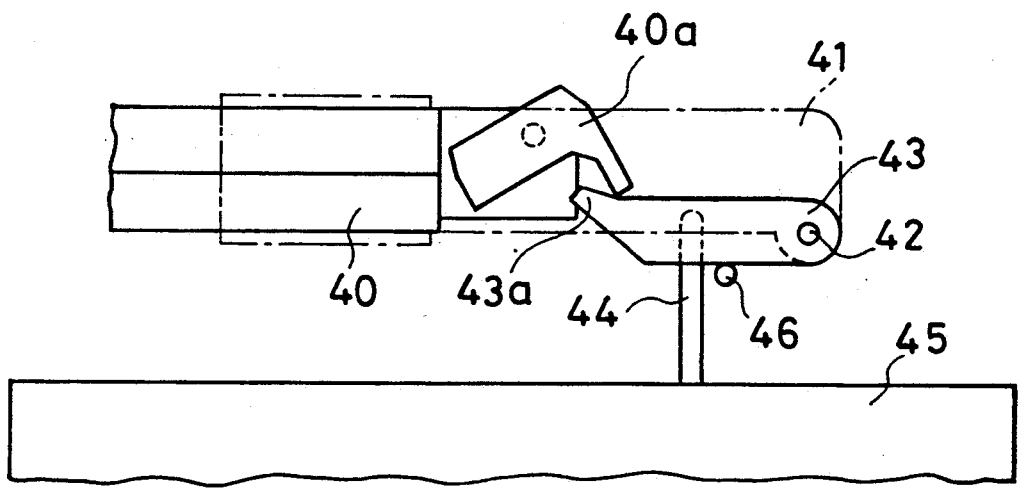
Figure 12:
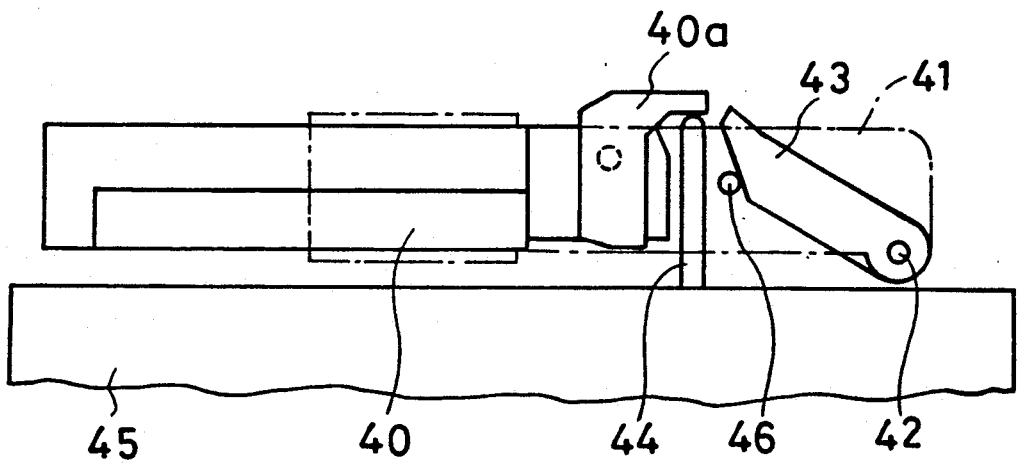
Figure 13:
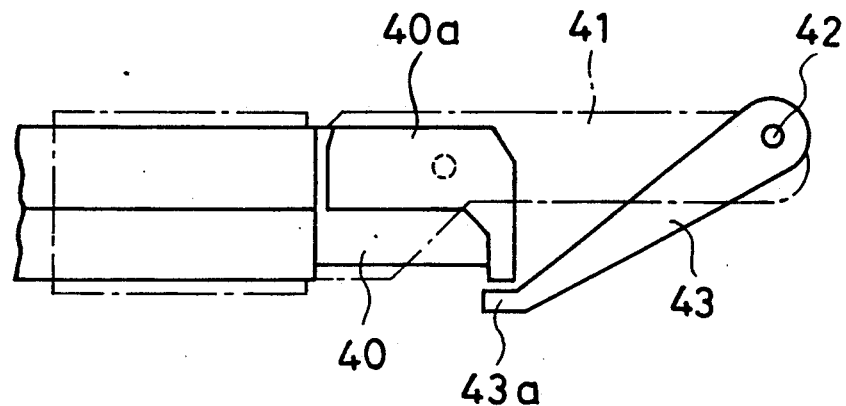
FIG. 13 and FIG. 14 are side view showing the disadvantage of another conventional loading mechanism of cassette tape recorder.
Figure 14:
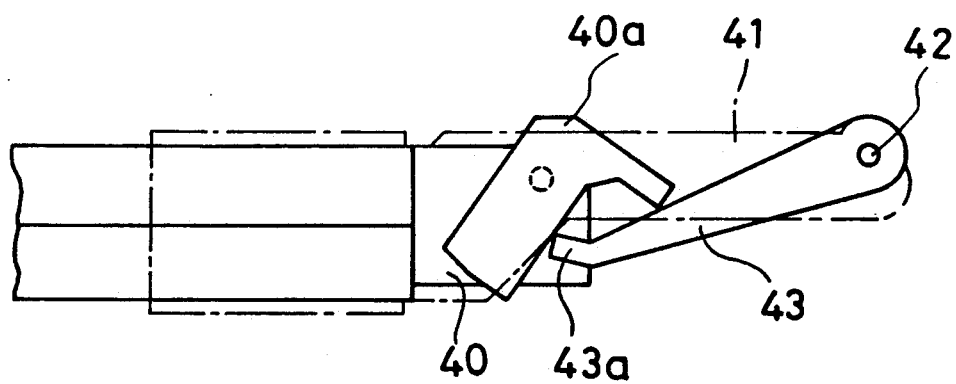

At this time, the third guide pin 8c also moves along the third guide groove 6c, and the link lever 23 coupled with the third guide pin 8c also proceeds to the interior of the frame 4. During the movement of the link lever 23, the link lever 23 is rotated in a clockwise direction, i.e., the same direction as the force due to the spring 27 around the guide pin 8c responding to changes of relative positions of the third guide groove 6c and the guide groove 7. And the lid opening lever 19 rotate in counterclockwise direction until the hook 22 of the lid opening lever 19 touches the end of the cassette holder 2 linked with the rotation of the link lever 23 in clockwise direction. As a result, the lid 1a of the cassette 1 is opened to a predetermined angle, as shown in FIGS. 5 and 7.

Thereafter, the first and the second guide pins 8a and 8b are moved down along the perpendicular parts at the first and the second guide grooves 6a and 6b, and the cassette holder 2 with the cassette 1 therein also moves down, finally coming to a predetermined playing position. During the downward movement of the cassette holder 2, the lid 1a of the cassette 1 is opened to a predetermined angle by being pushed by the hook 22. And thereafter it is fully opened by further touching by the upward moving opening member 22.

The force of the spring 27 for opening the lid 1a of the cassette 1 via the lid opening lever 19 overcomes the force of the spring in the cassette 1 for closing the lid 1a, so that the state of opening of the lid 1a to the full open angle is maintained. Accordingly, the opening operation of the lid 1a has no relation to the relative positions of the third guide pin 8c in the third guide groove 6c and the guide pin 26 in the guide groove 7. As a result, the opening state of the lid 1a in the predetermined full angle is kept even when both of the guide pin 8c and the pin 26 are positioned in the opening 28.

During the movement for taking out the cassette 1 from the set position to the insert position, the cassette 1, the cassette holder 2 and the sliding lever 3 are moved in opposite directions opposite to those mentioned above. In the movement of the cassette 1, the link lever 23 is forcibly rotated in counterclockwise direction, overcoming the clockwise rotational force of the spring 27 applied thereto, owing to the change of the relative positions of the third guide pin 8c and against the guide pin 26. As a result, the lid opening lever 19 is rotated in clockwise direction around the pivot 20 and the contact of the hook 22 with the lid 12 is released. Finally, the lid 1a of the cassette 1 is closed by the force of the spring (not shown in the figure) in the cassette 1 in a direction to close the lid 1a.

In the above-mentioned embodiment, the lid opening lever 19 and the link lever 23 constitutes the opening and closing lever for opening and closing the lid 1a.

As a modification, another opening and closing lever of an independent body which is rotatably provided in the vicinity of lower and rear end part of the cassette holder 2 may be used, for opening and closing the lid directly.

The present invention can be used not only for the apparatus using a DAT cassette, but also, for other cassette, for example, containing a magnetic disc or an optical disc.

in the loading mechanism of a cassette tape recorder in accordance with the present invention, since the guide pin 26 for opening and closing of the lid 1a of the cassette 1 is driven along the guide groove 7 accompanying the movement of the cassette holder 2 and the opening/closing lever constituted by the lid opening lever 19 and the link lever 23 is forcibly rotated, the lid 1a of the cassette 1 is reliably opened and closed.

Furthermore, since the opening state of the lid 1a of the cassette 1 is maintained by the force of the spring 27 which is in the direction to open the lid 1a, there is no need of forming a special guide groove on the frame for maintaining the opening state of the lid 1a. Therefore, the position of the guide groove 7 for opening and closing the lid 1a on the frame 4 is freely designed, and according to the present invention the size of the apparatus is much decreased.

Still more, in the present invention, the lid 1a of the cassete 1 is opened by the movement of the hook 22 of the lid opening lever 19, which is rotated by rotation of the link lever 23. The link lever 23 is rotated around the third guide pin 8c at a position where is apart from the deck of the apparatus and far from the insert position of the apparatus. A space below the third guide pin 8c and above the deck is used for mounting other driving mechanism or the like, and thereby the size of the apparatus is made small.

Although the invention has been described in its preferred form with a certain degree of particularity, it is understood that the present disclosure of the preferred form has been charged in the details of construction and the combination and arrangement of parts may be resorted to without departing from the spirit and the scope of the invention as hereinafter claimed.

What is claimed is:

1. Loading mechanism of cassette tape recorder comprising:
    a cassette holder for carrying a cassette provided with a lid between an insertion position and a setting position;
    a link lever rotatably supported in the vicinity of a rear end of said cassette holder;
    a lid opening lever which has a hook for pushing said lid to open by rotation thereof and is coupled with said link lever at a moving end part of said link lever and rotates relative to said link lever;
    wherein said lid opening lever moves said cassette lid through a predetermined angle as said link lever moves rotatably on said cassette holder as said cassette holder carries said cassette between an insertion position to a setting position.

2. Loading mechanism of cassette tape recorded comprising:
    a cassette holder for carrying a cassette provided with a lid between an insertion position and a setting position and having guide pins on side walls thereof;
    a link lever rotatably supported in the vincinity of a rear end of said cassette holder by an opening and closing guide pin;
    a lid opening lever which has a hook for pushing said lid to open by rotation thereof and is coupled with said link lever at a moving end part of said link lever and rotates relative to said link lever;
    a frame having substantially L-shaped guide grooves on both side walls thereof to be coupled with said guide pins for guiding the movement of said cassette holder and having an opening and closing guide groove on at least one side wall to be coupled with said opening and closing guide pin for guiding the rotation of said link lever to move said lid opening lever to forcibly open and close said cassette lid;
    wherein said lid opening lever moves said cassette lid through a predetermined angle as said link lever moves rotatabley on said cassette holder as said cassette holder carries said cassette between an insertion position and a setting position.

3. Loading mechanism of cassette tape recorder comprising:
    a cassette holder for carrying a cassette provided with a lid between an insertion position to a setting position;
    a link lever rotatably supported in the vicinity of a rear end of said cassette holder by an opening and closing guide pin;
    a lid opening lever which has a hook for pushing said lid to open by rotation thereof and is coupled with said link lever at a moving end part of said link lever and rotates relative to said link lever;
    a frame having substantially L-shaped guide grooves on both side walls thereof to be coupled with said guide pins for guiding the movement of said cassette holder and having an opening and closing guide pin on at least one side wall to be coupled with said opening and closing guide pin for guiding the rotation of said link lever to move said lid opening lever to forcibly open and close said cassette lid;
    a spring provided between said link lever and said cassette holder for urging said lid opening lever in a direction to open said lid;
    wherein said lid opening lever moves said cassette lid through a predetermined angle as said link lever moves rotatably on said cassette holder as said cassette holder carries said cassette between an insertion position and a setting position.

* * * * *